No. 718,663. PATENTED JAN. 20, 1903.
A. SHEARER.
COMBINED LISTER PLOW AND PLANTER.
APPLICATION FILED AUG. 19, 1901.
NO MODEL. 2 SHEETS—SHEET 1.

Witnesses:
Arthur McArthur
R. E. Riery

Inventor:
Andrew Shearer
By Fischer & Thorpe
Attys.

No. 718,663. PATENTED JAN. 20, 1903.
A. SHEARER.
COMBINED LISTER PLOW AND PLANTER.
APPLICATION FILED AUG. 19, 1901.
NO MODEL. 2 SHEETS—SHEET 2.
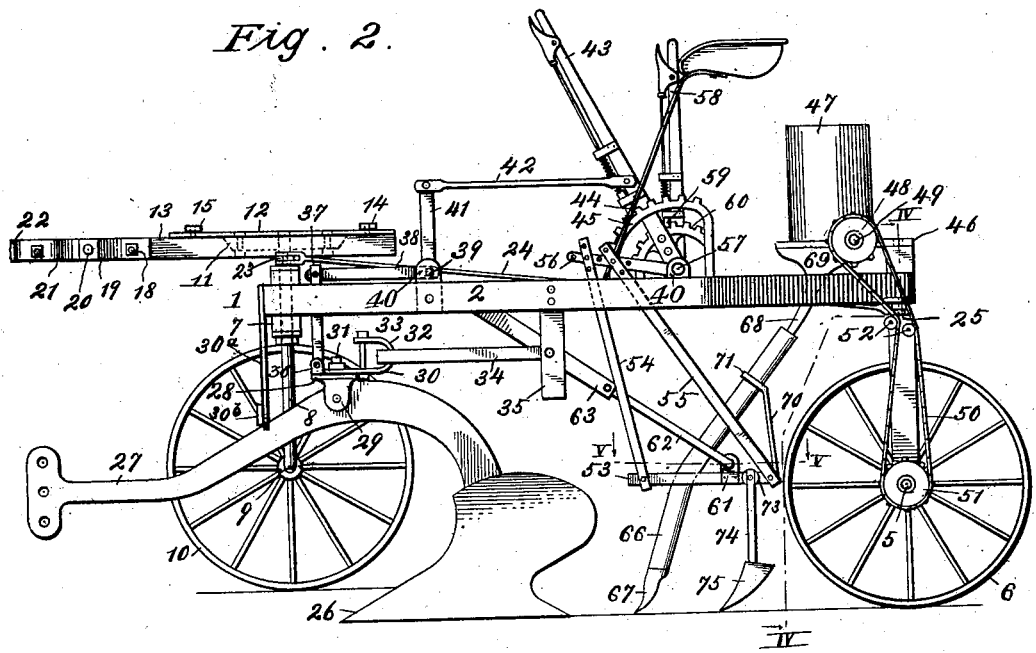
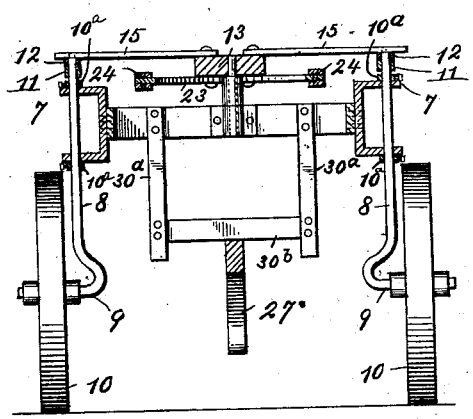
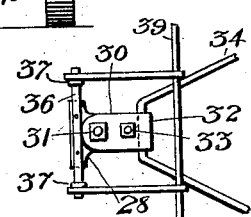
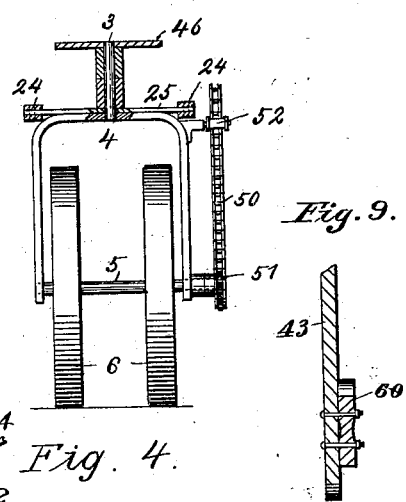
Witnesses:
Arthur McArthur
R. E. Riley
Inventor:
Andrew Shearer
By Fischer & Thorpe
Attys.

UNITED STATES PATENT OFFICE.

ANDREW SHEARER, OF FRANKFORT, KANSAS.

COMBINED LISTER-PLOW AND PLANTER.

SPECIFICATION forming part of Letters Patent No. 718,663, dated January 20, 1903.

Application filed August 19, 1901. Serial No. 72,540. (No model.)

*To all whom it may concern:*

Be it known that I, ANDREW SHEARER, a citizen of the United States, residing at Frankfort, in the county of Marshall and State of Kansas, have invented certain new and useful Improvements in a Combined Lister-Plow and Planter, of which the following is a specification.

My invention relates to a combined lister-plow and planter; and my object is to provide a machine of this character wherein the lister and drilling mechanisms are separately and independently adjustable to enable the operator to plant the seed at the depth desired irrespective of the kind or condition of the soil, wherein the wheels, both front and rear, swivel or turn on centers to enable the machine to turn short, while maintaining the same perpendicular relation to the frame, thereby eliminating possibility of capsizing, wherein the lister is held parallel with the tongue and front wheels in order to reduce the labor of the draft-animals and produce straighter rows, and wherein the rear wheels are turned a distance proportioned to the angle of the tongue to the line of draft.

With this general object in view and others, as hereinafter appear, the invention consists in certain novel and peculiar features of construction and combinations of parts, as hereinafter described and claimed, and in order that it may be fully understood reference is to be had to the accompanying drawings, in which—

Figure 1:
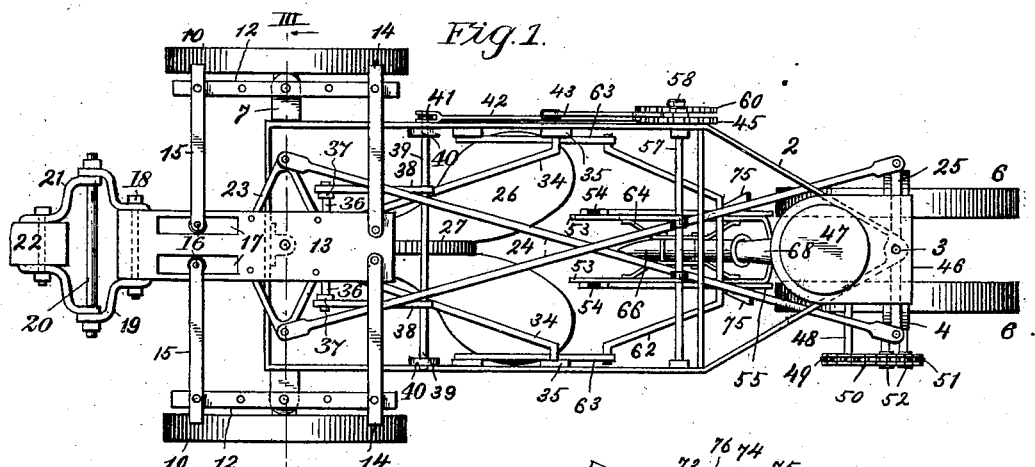
Figure 5:
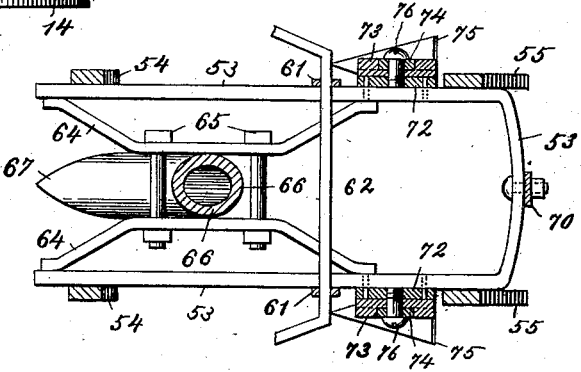
Figure 7:
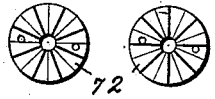
Figure 6:
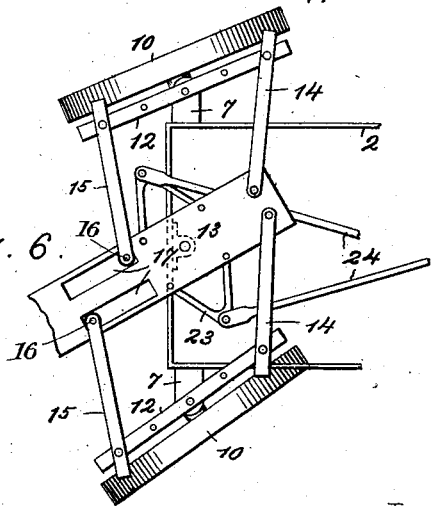

Figure 1 is a top plan view of a combined lister-plow and planter embodying my invention. Fig. 2 is a side elevation of the same with the near wheels omitted. Fig. 3 is a cross-section taken on the line III III of Fig. 1. Fig. 4 is a vertical section taken on the line IV IV of Fig. 2. Fig. 5 is an enlarged horizontal section taken on the line V V of Fig. 2. Fig. 6 is a plan view showing the position of the front wheel when turning. Fig. 7 is a face view of the radially-corrugated collars for holding the covering-shovels rigid. Fig. 8 is a plan view of the coupling connecting the lister and the parts carried by the wheeled frame, and Fig. 9 is a section showing one of the levers and sectors of the machine bolted together.

Referring to the drawings in detail, where like reference-numerals designate corresponding parts, a skeleton frame embodies the body portion 1, of oblong rectangular form, and the pointed rear portion 2, providing a journal in the longitudinal center of the frame for the vertical shaft 3, projecting upwardly from the vertical arched frame 4, the lower ends of said arch forming a journal for the transverse shaft or axle 5, upon which a pair of wheels 6 are mounted, one rigidly and the other loosely in order that the motion of the rigid one, as hereinafter explained, may be utilized to effect the dropping of the seed, while the other wheel is left free to turn independently on the shaft, and therefore with less friction on the ground.

7 designates a pair of vertical brackets rigidly secured to the outer sides of frame 1 near its front end and forming a wide bearing or journal for the vertical arms 8 of the stub-shafts 9, on which the front wheels 10 are journaled, said stub-shafts, in connection with the frame and brackets, constituting the front axle, collars 10ª upon said arms serving to support the frame at the desired height above the wheels, and mounted upon the upper ends of arms 8 and extending longitudinally of the machine are a pair of bars 11, surmounted by longer bars 12, adjustable on the former, so as to attain perfect alinement of the front wheels.

13 designates the short center bar, extending longitudinally of and above the front end of the frame and pivoted near its center to the front end of same and projecting forwardly therefrom, and 14 designates transverse links which pivotally connect the rear end of the center bar with the rear ends of bars 12. 15 designates similar links which are pivotally connected at their outer ends to the front ends of bars 12 and at their inner ends carry vertical rollers 16, engaging longitudinal slots 17 in the center bar. This center bar is provided with a clamping-bolt 18 for rigidly securing the brackets 19 thereto, which brackets, in conjunction with the securing-bolt 20 and similar brackets 21 on tongue 22, constitute a hinge connection which enables the tongue to rise and fall independent of the center bar, while compelling both to move laterally together when the machine is being turned.

23 designates a bracket secured to the under side of the center bar 13 and projecting laterally each way therefrom, and 24 a pair of crossed rods which extend downward and rearward and are pivotally connected at their rear ends to the opposite ends of the cross-bar 25, keyed or otherwise rigidly mounted on shaft 3 above arch 4. By this connection it is obvious that as the machine turns to the left it swings the front portions of the rear wheels to the right, and therefore more nearly concentric of the center around which the machine turns, and as one of the rear wheels rotates independently on the shaft or axle 5, as hereinbefore explained, said wheel rolls more or less rapidly than said shaft or axle, accordingly as it is located at the off or outer side or near or inner side, as will be readily understood. In this turning operation it will be observed by reference to Fig. 6 that the machine turns readily without the use of caster-wheels, as both the front and rear wheels turn on their own centers, thus keeping the perpendicular relation of the wheels and frame always the same. In this turning action the parallel relation always maintained between the front wheels when traveling straight forward is disturbed to such an extent that while both turn in the same general direction they diverge forwardly, as shown in Fig. 6, the wheel at the side toward which the turn is made being turned at a greater angle, and therefore making a shorter turn than the wheel at the opposite side. This variation in the movement of said wheels is accomplished because the contiguous or inner ends of the rear connecting-bars are pivoted to opposite sides of the longitudinal center of the center bar and also because the rollers at the inner ends of the front connecting-bars play longitudinally in the slots 17, the one at the side toward which the machine is turning rolling to the rear end of said slot, while the other rolls to the front end of its respective slot. This obviously turns the front wheels out of parallel, and by causing them to describe independent circles of varying diameters—the outer one the circle of greatest diameter—facilitates the turning operation, as will be readily understood, and in this connection it should be stated that the use of two rear wheels swiveled to the frame instead of a caster lends stability to the machine and eliminates possibility of upsetting in turning.

26 designates the lister or double-moldboard plow, and 27 the customary upwardly and forwardly projecting beam thereof. A coupling for raising or turning the lister laterally through instrumentalities to be hereinafter described comprises a horizontal transverse plate 28, provided with vertically-depending ears 29, embracing opposite sides of and bolted to the plow-beam, and a second plate 30 is pivotally connected to the first by means of a king-bolt 31 and formed at its rear end with an open loop 32, said loop being closed at its open or front side by a bolt 33 in order that there shall be no accidental disengagement between said loop and the bail 34, pivoted to arms 35 to operate in a vertical plane and projecting forwardly from said arms, the latter being secured rigidly to and depending from the sides of frame 1, as shown in Fig. 2. In this construction the king-bolt acts as a pivot to permit the ends of the lister to move laterally, but not its center, and relieves the plate 30 and its connections above of the strain incident to the lateral vibration or motion of the lister. By the construction above described a leverage is obtained on the lister, whereby it is easily held parallel with the wheels and tongue, the result being straighter rows can be made and the draft materially diminished, it being understood that the connection between the lister and the draft-animals is at the front end of the beam, while the share and moldboards of the lister are the points of resistance. The king-bolt is the fulcrum. Hence the power applied at the front end of the beam is greater than that of the tendency of the plow, which is nearer the fulcrum, to move sidewise. The latter cannot therefore swing laterally while embedded in the ground with the animals pulling on the front end of the beam. The action is somewhat analogous to that of the rudder of a boat, wherein the propulsion of the latter in a straight line causes the water to hold the rudder trailing behind in line with the movement of the boat, it being assumed, of course, that the boat is not moving across current, the rudder only swerving laterally under a positive application of power or when the boat moves to one side or another out of its direct path.

36 is a cross-bar mounted on plate 28 and pivotally connected at its ends to the vertical links 37, pivoted to and depending from the cranks 38 of rock-shaft 39, journaled in bearings 40 of the frame, and said rock-shaft is provided with an upwardly-projecting arm 41, connected by a link 42 with a lever 43, fulcrumed on shaft 57, said lever having the usual spring-actuated dog 44 for engagement with a notched sector 45, secured rigidly to the frame. The manipulation of the lever back and forth raises or lowers the lister, and the dog by engagement with the sector locks it in the position desired. To hold the front end of the beam down when the lister is being raised and also to prevent said beam from striking the wheels in turning, a pair of bars 30$^a$ depend from the front end of the frame at opposite sides of the beam and are connected together above the beam by a cross-bar 30$^b$.

Arranged upon the rear end of the frame is a table 46, supporting the usual or any preferred type of seedbox 47 and seed-dropping devices, (not shown,) the seed-dropping devices being actuated by the usual driven shaft 49. In this instance said shaft is provided with a sprocket-wheel 48, connected by a sprocket-chain 50 to a similar sprocket-wheel 51 on the end of shaft or axle 5, the chain being provided with the usual tension device, such as rollers 52, to which of course no claim is made.

Extending longitudinally of the frame and arranged between the lister and the rear wheels is an elongated frame 53, the same being supported and maintained in substantially a horizontal position by means of the front and rear links 54 and 55, respectively, said links being adjustable and pivotally connected at their rear ends to crank-arms 56 of the shaft 57. Said shaft carries a rigid arm or lever 58, provided with a spring-actuated dog 59 for engagement with the notched sector 60, rigidly bolted or otherwise secured to lever 43 (see Figs. 2 and 9) concentrically of said shaft. By this arrangement it will be seen that by throwing lever 43 back and forth to raise or lower the lister, frame 53 is also raised or lowered, and it will also be noticed that independent vertical adjustment between the lister and said frame is effected by withdrawing dog 59 from sector 60 and moving lever 58, the dog by engagement with the sector locking the frame at the desired elevation.

As a means for controlling and regulating the movement of the frame when being raised or lowered it is provided with ears 61, pivotally engaged by a draft-bail 62, mounted on rigid arms 63, depending from the frame forward of frame 53. Clamped between brackets 64, carried by said frame, and bolts 65, connecting said brackets, is a seed-spout 66, the same being arranged in longitudinal alinement with the point of the lister and carrying at its lower end a drill-hoe 67. It is connected at its upper end to a flexible tube or hose 68, having a bell-mouth 69 at its upper end underlying the table and adapted to receive the seed as dropped from the seedbox. As a further means of securing the seed-spout rigidly with relation to the frame the latter carries a rigid arm 70, terminating at its upper end in a collar 71, embracing said spout.

For the purpose of covering the seed deposited plates 72 are secured to opposite sides of frame 53 and have their outer faces radially corrugated to receive the corresponding inner faces of plates 73, which plates are provided with vertical grooves in their outer sides, engaged by the shanks 74 of the covering-shovels 75, clamping-bolts 76 passing through the shanks and outer plates 73 and engaging the inner plates serving to clamp the parts immovably together, with the coverers in longitudinal alinement with the rear wheels.

As the functions of the various parts have been explained in connection with the detail description thereof, it is believed that a recapitulation of the operation is unnecessary. The machine is handled in the manner common to this class of machines, the lister making the furrow, the drill planting the seed, the covering-shovels throwing the soil inward over the seed, and the rear wheels, longitudinally alined with the covering-shovels, gaging the depth of the furrow, as well as providing a stable support for the rear end of the machine, particularly when turning, and while the preferred embodiment of the invention is herein illustrated and described it is to be understood that I reserve the right to make such changes in the form, proportion, detailed construction, and arrangement of the parts as properly fall within its spirit and scope.

Having thus described the invention, what I claim as new, and desire to secure by Letters Patent, is—

1. In a combined lister-plow and planter, a suitable frame, a lister below the same, means for raising and lowering the lister, means to secure the lister at the desired point of adjustment, a drill-carrying frame below the first-named frame and rearward of the lister, a connection between the lister and drill-carrying frame, and mechanism whereby the latter may be raised and lowered independently of or simultaneously with the former.

2. In a combined lister-plow and planter, a suitable frame, a lister below the same, means for raising and lowering the lister, means to secure the lister at the desired point of adjustment, a drill-carrying frame below the first-named frame, and rearward of the lister, means to raise and lower the drill-carrying frame independently of the lister, and connections whereby the raising and lowering of the lister shall effect a corresponding movement of the drill-carrying frame.

3. In a combined lister-plow and planter, a suitable frame, a lister below the same, a lever connected to raise and lower the lister, means to secure the lever at the desired point of adjustment, a drill-carrying frame below the first-named frame and rearward of the lister, a crank-shaft connected to the drill-carrying frame to raise and lower it independently of the lister, a lever to operate said crank-shaft, and means whereby movement of the first-named or lister lever shall effect movement of the crank-shaft lever.

4. In a combined lister-plow and planter, a suitable frame, a lister below the same, a lever connected to raise and lower the lister, a dog and sector to secure the lever at the desired point of adjustment, a drill-carrying frame below the first-named frame and rearward of the lister, a crank-shaft connected to the same to raise or lower it, a lever mounted on the crank-shaft and provided with a dog, and a sector movable with the lister-lever and engaged by the dog of the drill-carrying-frame lever, substantially as and for the purpose set forth.

5. In a combined lister-plow and planter, a suitable frame, a rock-shaft mounted therein and provided with a lever, and a pair of crank-arms, a drill-carrying frame below the first-named frame, and a plurality of links pivotally connecting each crank-arm at different distances from its axis with the drill-carrying frame forward and rearward of its center, substantially as and for the purpose described.

6. In a combined lister-plow and planter, a suitable frame, a rock-shaft journaled therein and provided with a lever and a pair of crank-arms, a drill-carrying frame below the first-named frame, a plurality of links pivotally connecting the first-named frame with said crank-arms, and a bail operative in a vertical plane and supported from the first-named frame, and pivotally connected to the drill-carrying frame, substantially as described.

7. In a combined lister-plow and planter, a suitable frame, a rock-shaft journaled therein and provided with a lever and a pair of crank-arms, a drill-carrying frame below the first-named frame, a plurality of links pivotally connecting the first-named frame with said crank-arms, a bail operative in a vertical plane and supported from the first-named frame and pivotally connected to the drill-carrying frame, and covering-shovels rigidly secured to and depending from the drill-carrying frame rearward and at opposite sides of the drill, substantially as described.

8. In a combined lister-plow and planter, a suitable wheeled frame, a frame below the same and provided at its opposite sides with covering-shovels, brackets secured to said last-named frame, clamping-bolts connecting said brackets, a seed-spout extending down between said brackets and clamping-bolts and provided with a drill-hoe at its lower end, a brace secured to the drill-carrying frame, and embracing the seed-spout at its upper end, a bail pivotally connecting the drill-carrying frame with the wheeled frame, means for supplying seed to the seed-spout, a rock-shaft mounted on the wheeled frame and connected to the drill-carrying frame, and means for securing said rock-shaft at the desired point of adjustment, substantially as described.

In testimony whereof I affix my signature in the presence of two witnesses.

ANDREW SHEARER.

Witnesses:
N. J. GREGG,
H. H. LOWNEY.